Patented Aug. 30, 1932

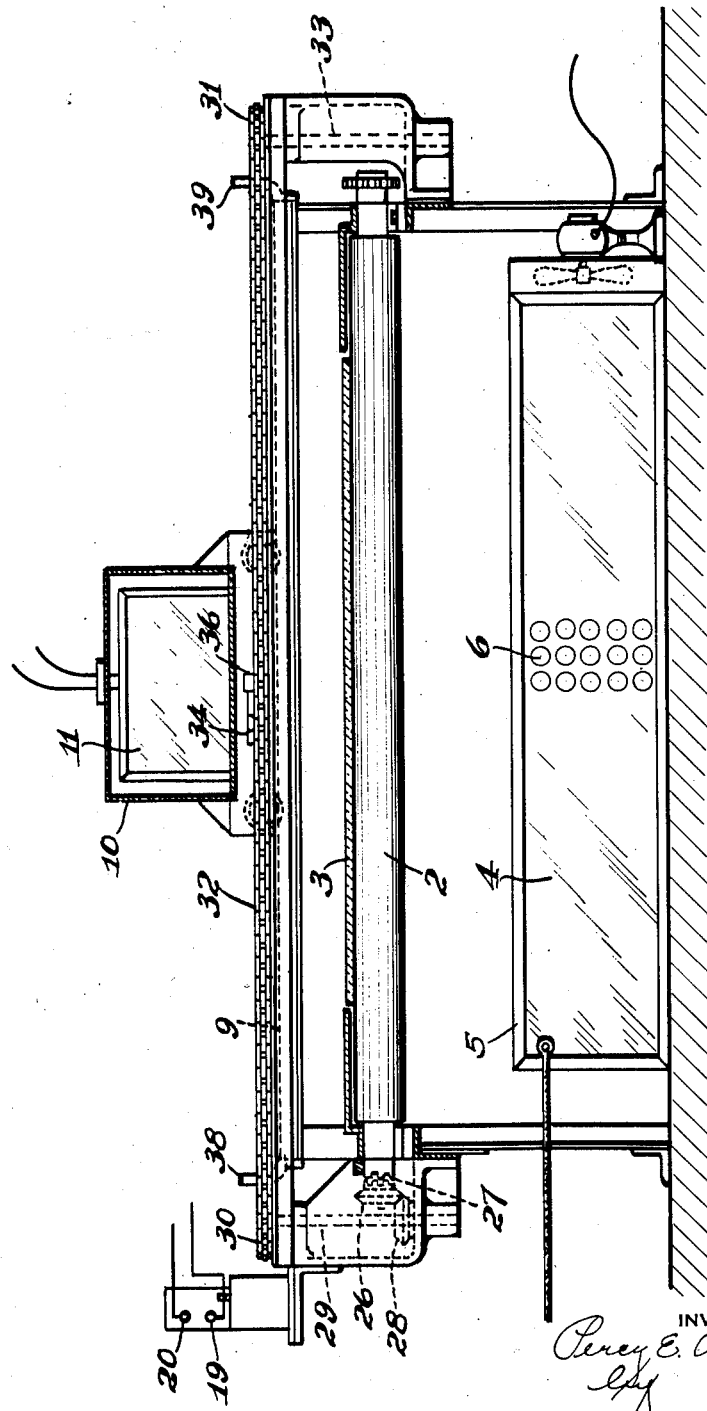

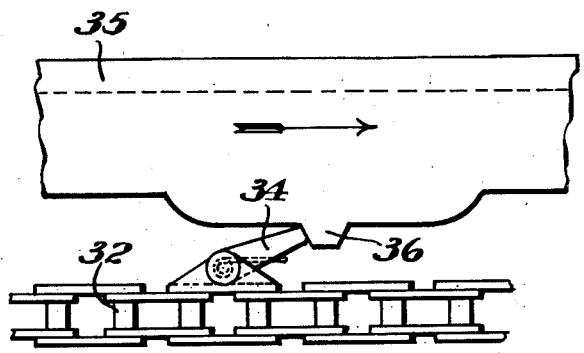
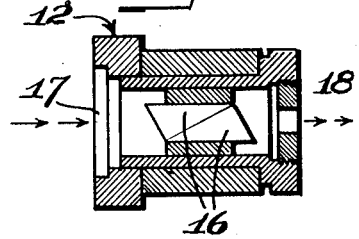
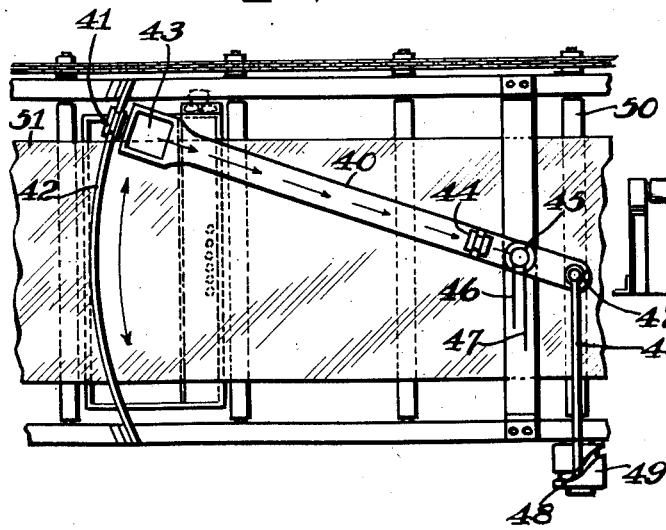
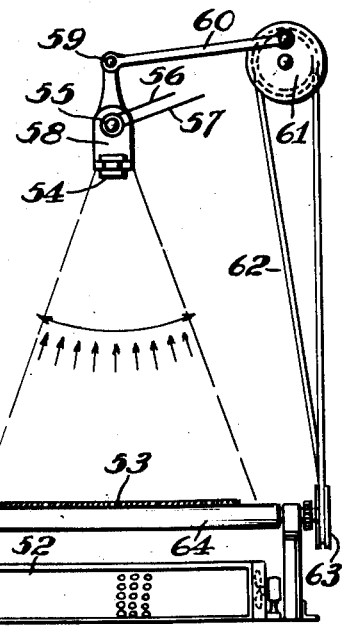

1,874,217

UNITED STATES PATENT OFFICE

PERCY E. ARBERRY, OF PITTSBURGH, PENNSYLVANIA, ASSIGNOR TO PITTSBURGH PLATE GLASS COMPANY, A CORPORATION OF PENNSYLVANIA

GLASS INSPECTION APPARATUS

Application filed July 1, 1930. Serial No. 465,073.

Figure 1:
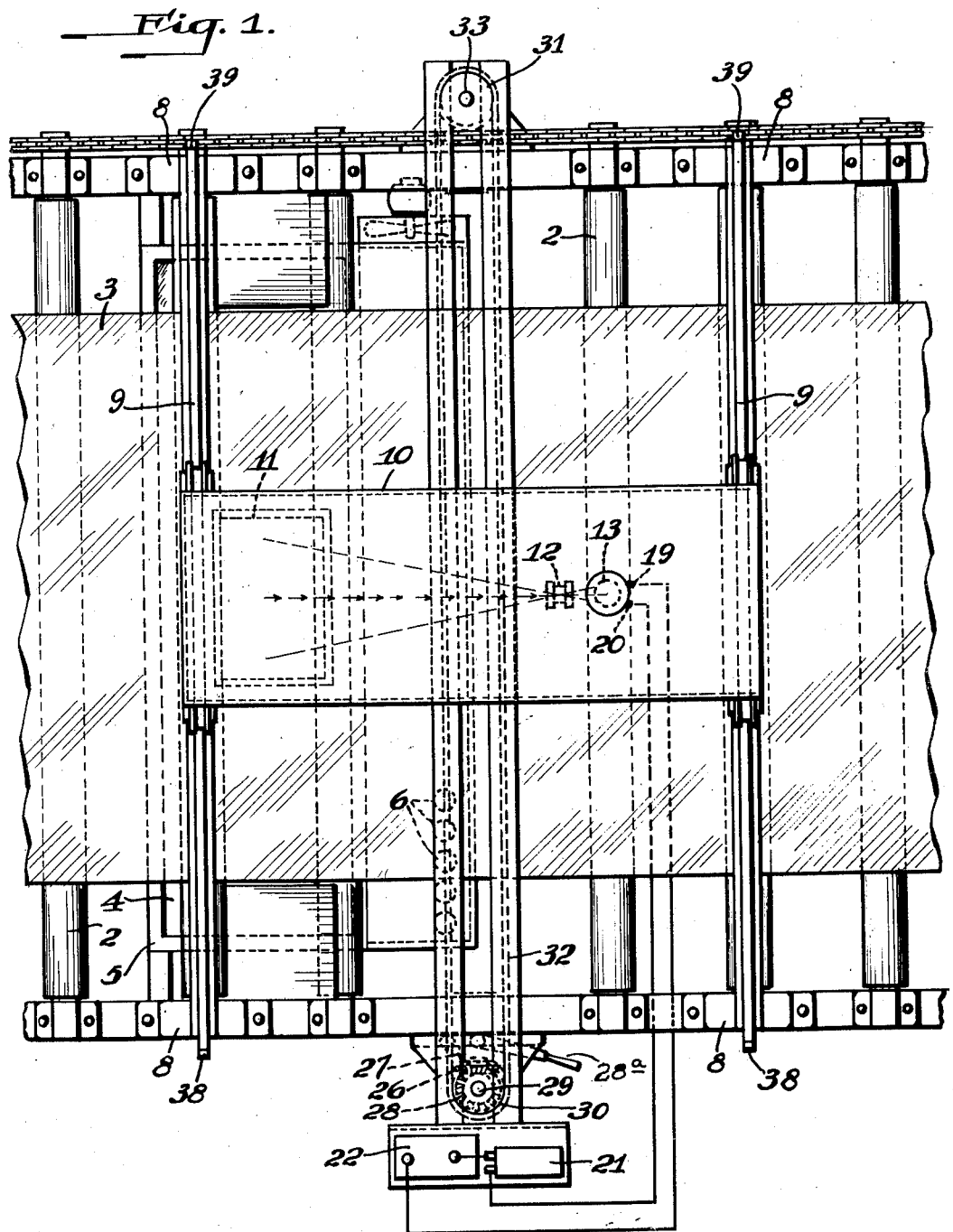
Figure 2:
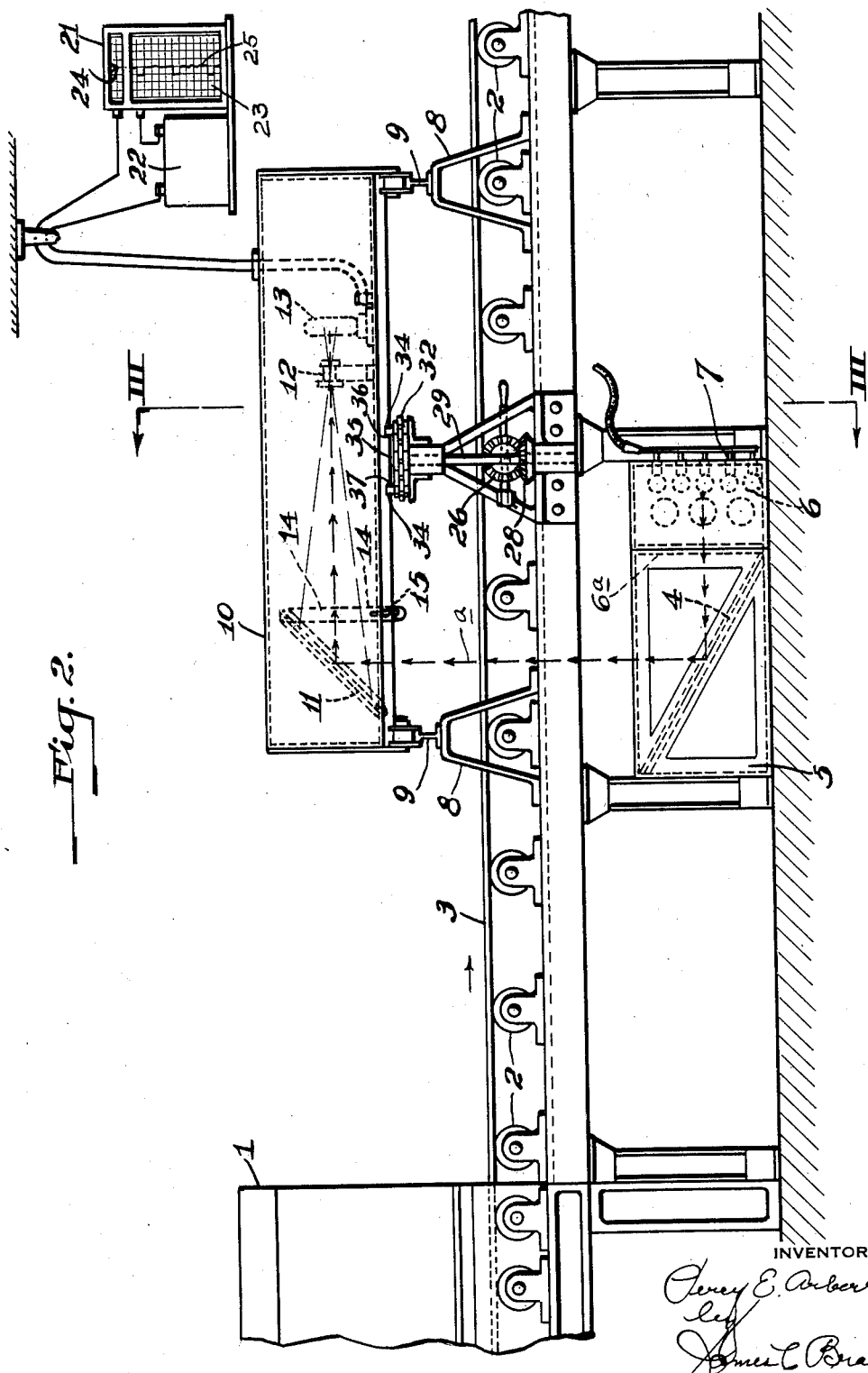

The invention relates to apparatus for indicating and recording strain in a forwardly moving glass sheet, such as that formed in a continuous or semi-continuous rolling operation. The invention has for its object the provision of an improved apparatus which will operate automatically and give a continuous and accurate record of the strain conditions in a sheet of glass or series of sheets which are carried past the apparatus. The apparatus operates on the principle of the apparatus of the Lytle Patent No. 1,671,772 of May 29, 1928 in that polarized light is reflected through the glass sheet and then passed through an analyzer, but the present apparatus includes in addition, a photo-electric cell upon which the light from the analyzer is directed, and recording means, such as a recording milli-ammeter or milli-volt meter connected to the terminals of the photo-electric cell. The apparatus also includes in its preferred form means for automatically shifting the apparatus back and forth across the sheet so that a record is made of the entire width of the sheet. Certain embodiments of the invention are shown in the accompanying drawings, wherein:

Figure 1 is a plan view of the apparatus as applied at the outlet end of a roller leer. Fig. 2 is a side elevation. Fig. 3 is a section on the line III—III of Fig. 2. Fig. 4 is a detail elevation of a part of the mechanism. Fig. 5 is an enlarged section through the analyzer. Fig. 6 is a plan view of a modification. And Fig. 7 is a front elevation of still another modification.

Referring to the drawings, 1 is the outlet end of a leer; 2, 2, 2, etc. are a series of rolls constituting a runway and forming an extension of the leer runway; and 3 is a sheet of glass which has been annealed and which is moving in the direction of the arrow past the apparatus for indicating and recording the strain in the glass which constitutes the subject matter of the present invention. Extending transversely beneath the runway and the sheet of glass 3, is a reflector 4, preferably of black Carrara glass, which acts as a polariscope. This reflector is mounted in a casing 5 and receives the light from a large number of electric lamps 6 back of the frosted plate 6a and carried by the plate 7 in opposition to the inclined face of the reflector. The light from the lamps is reflected up through the glass sheet 3, as indicated by the series of arrows a. Mounted upon the pairs of brackets 8, 8 above the glass are the rails 9, 9, and upon the rails 9, 9 is a carriage 10. Upon the carriage is an inclined reflector 11 preferably of silvered glass for receiving the light rays from the reflector 4. Also mounted on the carriage is an analyzer 12 and a photo-electric cell 13. The reflector 11 is mounted for adjustment as to angle by means of a pair of links 14 which are slotted and clamped in any desired position by means of a pair of screws 15.

The analyzer comprises a casing carrying a pair of nickel prisms 16 and having at one end a mica quarter wave or selenite plate 17. This analyzer is positioned so as to receive the light reflected from the mirror 11 and transmit it through the opening 18 onto the photo-electric cell 13. The photo-electric cell may be of any approved type and has its terminals 19 and 20 in circuit with a coil of a milli-ammeter or milli-volt meter 21 and a battery or amplifier 22. The ammeter or volt-meter is of the recording type and provided with a rotating drum carrying a ribbon 23, and the recording arm 24 of the meter is provided with a pen so that the record 25 is made upon the ribbon. A record is thus made of the variations in current flow through the meter, and such variations of flow depend upon the light reflected from the mirror 11 and transmitted through the analyzer 12 and the photo-electric cell. The color of the light and its intensity will vary depending upon the condition of strain in the glass 3, so that the apparatus will give a continuous record of the strain conditions in the sheet 3.

The carriage 10 may be left in one position during the making of the record so that the condition of strain at any point in the width of the sheet may be recorded, but preferably the carriage is moved back and forth along the rails 9 so that a record is secured of the strain conditions in the sheet across its entire width. The movement of the carriage back and forth along the rails is preferably made automatic and the drive is accomplished from one of the rolls 2 of the runway, as indicated in Fig. 3. The shaft of this roll has loose upon its end a bevel gear 26 having a clutch surface adapted to be engaged by the clutch member 27 which is splined onto the shaft of the roll, such clutch being operable by means of the hand lever 28ᵃ. The gear 26 meshes with the gear 28 on the shaft 29 and the upper end of this shaft is provided with a sprocket wheel 30. Extending around this sprocket and the sprocket 31 on the other side of the table is a chain 32, such sprocket 31 being mounted upon a vertical shaft 33. When the clutch member 27 is in operative position, the chain 32 is driven continuously. This chain 32 carries a dog 34 for moving the carriage 10. The carriage is provided on its lower side with a plate 35 provided with a pair of lugs 36 and 37 adapted to be engaged by the dog 34. By this arrangement, the carriage is moved in one direction when the dog engages the lug 36 and is moved in the other direction when the dog engages the lug 37. A pair of stops 38 and 39 are provided on the framework which supports the runway rolls for engaging the carriage and limiting its movement. If the carriage is moving to the right (Fig. 3) by reason of the engagement of the dog 34 with the lug 36, the dog is disengaged from the lug 36 when the carriage strikes the stop 39, the angle of engagement between the end of the dog and the lug being such that the parts will slip over each other when the carriage is stopped. The carriage will remain in this position until the dog is carried by the chain around to a position such that it will engage another lug carried by the member 35 opposite the lug 36 and similar thereto, at which time the carriage will be moved to the left. The dog is disengaged from the second lug 36 when the carriage reaches the stop 38 and this back and forth movement of the carriage is continued as long as the clutch 27 is left in operative position. Any other suitable means might, of course, be employed for giving the carriage its back and forth movements.

Fig. 6 illustrates a modification for accomplishing the same result as that accomplished by the apparatus of Figs. 1 to 5. The primary difference is in the method of mounting the apparatus for movement relative to the sheet of glass. In this apparatus, a swinging arm 40 is substituted for the carriage 10, the end of this arm being provided with a roller 41 which moves on the track 42. The end of the arm carries a mirror 43 corresponding in function to the mirror 11 of the Figs. 1 to 5 construction. The analyzer 44 is also mounted on the arm in position to receive the light reflected from the mirror 43. A photo-electric cell 45 similar to that heretofore described is mounted on the arm in position to receive the light from the analyzer, and the terminals 46 and 47 of this photo-electric cell are connected to a recording apparatus similar to that heretofore described. The arm is pivoted at a point immediately beneath the photo-electric cell and a swinging movement of this arm about this pivot is accomplished by the means of the rod 46 pivoted at 47 to the arm. The rod 46 carries at its end a roller 48 which engages a cam groove in the member 49. This member is driven from one of the runway rolls 50 and the engagement of the roller in the cam groove causes the rod to reciprocate back and forth so that the mirror 43 is swung back and forth from one side of the glass sheet 51 to the other.

Fig. 7 illustrates a further modification in which the light from the mirror 52 beneath the glass sheet 53 is received directly by the analyzer 54, such light being transmitted to the photo-electric cell 55 having the wires 56 and 57 connected to its terminals and to the recording apparatus. The photo-electric cell and analyzer are mounted upon a plate 58 pivoted at a point immediately behind the photo-electric cell and having its end 59 connected to the operating rod 60. The right hand end of the rod 60 is pivoted to the crank disc 61 driven by a belt 62 passing around a pulley 63 on one of the rolls 64 of the runway.

What I claim is:

1. The combination with a carrier for sheet glass, of a polarizing reflector extending across the sheet on one side thereof and adapted to direct light through the sheet as it moves past it, an analyzer, means whereby beams of light from one end of the reflector to the other are made to pass successively through the analyzer, means whereby this action is continuously repeated, a photo-electric cell positioned to receive the light from the analyzer, and a recording device connected to the terminals of the cell.

2. The combination with a carrier for sheet glass, of a polarizing reflector extending across the sheet on one side thereof and adapted to direct light through the sheet as it moves past it, a carriage on the side of the glass sheet opposite to the reflector mounted for movement across the sheet, a second reflector on the carriage positioned to receive the light reflected from the first reflector, an analyzer on the carriage positioned to receive light reflected from said second reflector, a photo-electric cell also mounted on the carriage in position to receive the light from the analyzer, and a recording device connected to the terminals of the cell.

3. The combination with a carrier for sheet glass, of a polarizing reflector extending across the sheet on one side thereof and adapted to direct light through the sheet as it moves past it, a carriage on the side of the glass sheet opposite to the reflector mounted for movement across the sheet, a second reflector on the carriage positioned to receive the light reflected from the first reflector, an analyzer on the carriage positioned to receive light reflected from said second reflector, a photo-electric cell also mounted on the carriage in position to receive the light from the analyzer, a recording device connected to the terminals of the cell, and automatic means for shifting the carriage back and forth across the glass sheet.

In testimony whereof, I have hereunto subscribed my name this 19th day of June, 1930.

PERCY E. ARBERRY.